United States Patent Office 3,192,268
Patented June 29, 1965

---

3,192,268
STABILIZED FORMALDEHYDE SOLUTIONS
George N. Butter, Terre Haute, Ind., assignor to Commercial Solvents Corporation, New York, N.Y., a corporation of Maryland
No Drawing. Filed Aug. 7, 1961, Ser. No. 129,519
7 Claims. (Cl. 260—606)

My invention relates to stabilized formaldehyde solutions. More particularly my invention relates to formaldehyde solutions stabilized against excessive polymerization and to a method for stabilizing formaldehyde solutions.

Formaldehyde, a product used in large quantities in the chemical industry, is generally transported as a 35–50% aqueous solution. The transportation of such solutions, however, is aggravated by the tendency of formaldehyde to polymerize and then settle out as a polymerized solid from the solution. Polymerization and concurrent deposition increase with decreases in temperature, thus during the cold seasons, transportation of concentrated formaldehyde solutions becomes impractical.

Various procedures have been attempted to minimize polymerization and solid deposition in formaldehyde solutions. For example, very low concentrations of formaldehyde in the solution on the order of 5–10% can be transported even in cold weather without excessive polymerization and deposition. However, since water is the main component, this method is practical only when small amounts of formaldehyde are transported. Also, various preservatives such as methanol, when incorporated in amounts of about 5–20% into the formaldehyde solution have demonstrated ability to impede polymerization even when used with concentrations of formaldehyde as high as 35–50%. The addition of such large amounts of methanol, however, not only is costly but necessitates separation of the methanol from the formaldehyde solution before use can be made of the formaldehyde. More recently it has been found that small amounts of hydroxylamine hydrochloride impede but do not completely prevent polymerization of formaldehyde and deposition from the aqueous solution of the solid polymerized material even under low temperature conditions. However, the difficulty in using hydroxylamine hydrochloride is that the material which does polymerize and settle as a solid deposit from the formaldehyde solution on subjection to lower temperature does not return to solution with a subsequent rise in temperature thus resulting not only in loss of material but necessitating the separation of the polymerized solid material from the formaldehyde solution.

I have now discovered a means whereby formaldehyde solutions of industrial concentrations can be substantially preserved against polymerization and deposition of solid material even when subjected to temperatures at which uninhibited formaldehyde solutions deposit substantial amounts of polymerized formaldehyde. More important, however, my invention permits ready resolution of polymerized formaldehyde which has been deposited at low temperatures merely by slightly raising the temperature of the solution.

Generally my invention involves addition of polymerization retarding amounts of compounds having the following general formula to formaldehyde solutions:

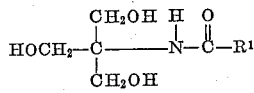

where R is the radical:

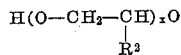

wherein $R^1$ is alkyl or alkenyl, wherein $R^2$ is hydrogen or lower alkyl, and wherein $x$ is an integer ranging from 1 to 20.

A process for the preparation of my polymerization inhibitors is described in copending Serial No. 129,518. In general, this process consists of oxyalkylating an amide having the following general formula:

$$HOCH_2-\underset{\underset{CH_2OH}{|}}{\overset{\overset{CH_2OH}{|}}{C}}-\underset{}{\overset{H}{N}}-\overset{O}{\overset{\|}{C}}-R^1$$

wherein $R^1$ is defined as above with a monoepoxyalkylene oxide at temperatures ranging from about 0 to about 150° C. in the presence of an alkaline catalyst.

Included among the inhibitors of my invention are

N-[tris(4-hydroxy-2-oxabutyl)methyl]heptadecenylamide,
N-[tris(4-hydroxy-3-methyl-2-oxabutyl)methyl]heptadecylamide,
N-[tris(4-hydroxy-3-ethyl-2-oxabutyl)methyl]nonylamide,
N-[tris(10-hydroxy-2,5,8-trioxadecyl)methyl]heneicosylamide,
N-[tris(16-hydroxy-2,5,8,11,14-pentaoxahexadecyl)methyl]hendecylamide, etc., and the like.

In carrying out my improved process, I have found that when amounts as low as 10 p.p.m. and as high as 500 p.p.m. by weight of my inhibitors, based on the weight of the formaldehyde solution, are incorporated in the formaldehyde solution, suitable results can be obtained. However, to obtain optimum results, I usually prefer to utilize from about 50 to about 200 p.p.m. of my inhibitors.

The following examples serve to illustrate my invention, but it is not intended that my invention be limited to the procedures or specific materials set forth therein.

*Example I*

A 1,000-milliliter portion of 44% formaldehyde solution containing a concentration of about 50 p.p.m. of N - [tris(4 - hydroxy-2-oxabutyl)methyl]heptadecenylamide and a 1,000-milliliter portion of a 44% formaldehyde solution containing no inhibitor were heated to about 100° F. and maintained at that temperature for 30 days. At the end of the 30-day period, the two portions were observed. The first portion containing the inhibitor showed only a small amount of solid deposition while the second portion containing no inhibitor was quite cloudy and showed a great deal of solid deposition. The temperatures of the two portions were then lowered to 60° F. and solid deposition occurred in each portion. The two portions were then heated to 120° F. with accompanying agitation. The solid material in the inhibited portion was observed to have substantially disappeared while the solid material in the portion not treated with the inhibitor was observed to be substantially unchanged.

*Example II*

The procedure of Example I was followed except that N - [tris(4 - hydroxy - 3 - methyl - 2 - oxabutyl)methyl]-heptadecylamide was utilized instead of N - [tris(4 - hydroxy - 2-oxabutyl)methyl]heptadecenylamide. Results similar to those of Example I were obtained.

*Example III*

The procedure of Example I was followed with the exception that N-[tris(4-hydroxy-3-ethyl-2-oxabutyl)methyl]nonylamide was utilized instead of N-[tris(4-hydroxy-2-oxabutyl)methyl]heptadecenylamide. Results similar to those of Example I were obtained.

The procedure of Example I was followed with the exception that N-[tris(10-hydroxy-2,5,8-trioxadecy)methyl]heneicosylamide was utilized instead of N-[tris(4-hydroxy-2-oxabutyl)methyl]heptadecenyloxazoline. Results similar to those of Example I were obtained.

*Example V*

The procedure of Example I was followed with the exception that N-[tris(16-hydroxy-2,5,8,11,14-pentaoxahexadecyl)methyl]hendecylamide was utilized instead of N-[tris(4-hydroxy-2-oxabutyl)methyl]heptadecenylamide. Results similar to those of Example I were obtained.

Now having described my invention, what I claim is:

1. An aqueous formaldehyde solution comprising aqueous formaldehyde and a sufficient amount of a compound having the following general formula:

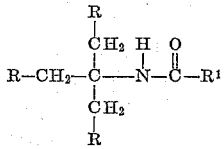

wherein R is the radical:

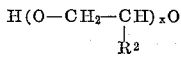

wherein $R^1$ is a member selected from the group consisting of alkyl and alkenyl, wherein $R^2$ is a member selected from the group consisting of lower alkyl and hydrogen, and $x$ is an integer ranging from 1 to 20 to stabilize said solution against deposition of solid material from the solution.

2. An aqueous formaldehyde solution comprising aqueous formaldehyde and a sufficient amount of N-[tris(4-hydroxy-2-oxabutyl)methyl]heptadecenylamide to stabilize said solution against deposition of solid material from the solution.

3. An aqueous formaldehyde solution comprising aqueous formaldehyde and a sufficient amount N-[tris(4-hydroxy-3-methyl-2-oxabutyl)methyl]heptadecylamide to stabilize said solution against deposition of polymerized formaldehyde from the solution.

4. An aqueous formaldehyde solution comprising aqueous formaldehyde and a sufficient amount of N-[tris(4-hydroxy-3-ethyl-2-oxabutyl)methyl]nonylamide to stabilize said solution against deposition of polymerized formaldehyde from the solution.

5. An aqueous formaldehyde solution comprising aqueous formaldehyde and a sufficient amount of N-[tris(10-hydroxy-2,5,8-trioxadecyl)methyl]heneicosylamide to stabilize said solution against deposition of polymerized material from the solution.

6. An aqueous formaldehyde solution comprising aqueous formaldehyde and a sufficient amount of N-[tris(16-hydroxy-2,5,8,11,14-pentaoxahexadecyl)methyl]hendecylamide to stabilize said solution against deposition of polymerized material from the solution.

7. An aqueous formaldehyde solution comprising aqueous formaldehyde and from about 10 p.p.m. to about 500 p.p.m. of a compound having the following general formula:

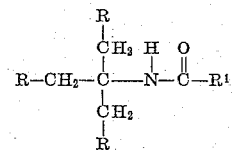

where R is the radical:

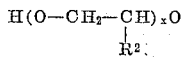

wherein $R^1$ is a member selected from the group consisting of alkyl and alkenyl, where $R^2$ is a member selected from the group consisting of hydrogen and lower alkyl, and wherein $x$ is an integer ranging from 1 to 20.

References Cited by the Examiner

UNITED STATES PATENTS 2,000,152   5/35   Walker _____ 260—606

OTHER REFERENCES

Walker: Formaldehyde (1953), pages 290–291.
Derwent: Belgian Patents Report, vol. 60(B), Jan. 15, 1960, page C18.

LEON ZITVER, *Primary Examiner.*